United States Patent [19]
Fischer et al.

[11] Patent Number: 6,139,083
[45] Date of Patent: Oct. 31, 2000

[54] SLIDING CORE VISOR

[75] Inventors: Douglas A. Fischer, Grand Rapids; Bradley D. Miller, Jenison, both of Mich.

[73] Assignee: Lear-Donnelly Overhead Systems, LLC, Southfield, Mich.

[21] Appl. No.: 09/296,482

[22] Filed: Apr. 22, 1999

Related U.S. Application Data

[60] Provisional application No. 60/082,883, Apr. 24, 1998.

[51] Int. Cl.[7] .......................................... B60J 3/02
[52] U.S. Cl. ................. 296/97.11; 296/97.9; 296/97.12; 362/144
[58] Field of Search ................................. 296/97.1, 97.5, 296/97.9, 97.11, 97.12, 97.13; 362/144

[56] References Cited

U.S. PATENT DOCUMENTS

| | | | |
|---|---|---|---|
| 5,143,678 | 9/1992 | Prillard | 296/97.5 X |
| 5,299,106 | 3/1994 | Buchheit et al. | 296/97.13 X |
| 5,486,033 | 1/1996 | Lecorvaisier et al. | 296/97.13 X |
| 5,533,776 | 7/1996 | Agro et al. | 296/97.9 |
| 5,653,490 | 8/1997 | Fink et al. | 296/97.11 |
| 6,059,348 | 5/2000 | Viertel | 296/97.9 |

*Primary Examiner*—Stephen T. Gordon
*Assistant Examiner*—Jason Morrow
*Attorney, Agent, or Firm*—Brooks & Kushman P.C.

[57] ABSTRACT

A vehicle sun visor assembly includes a shaft configured for mounting in a vehicle. The shaft includes in-molded first and second electrical wires extending longitudinally along the shaft. The first and second electrical wires include corresponding first and second exposed contact surfaces spaced circumferentially about the shaft. The sun visor body is pivotally and slidably mounted to the shaft and includes first and second mating contacts positioned for selective engagement with the first and second exposed contact surfaces only when the sun visor is positioned at a predetermined pivotal and longitudinal position with respect to the shaft for providing electrical power to a vanity mirror or the like.

11 Claims, 3 Drawing Sheets

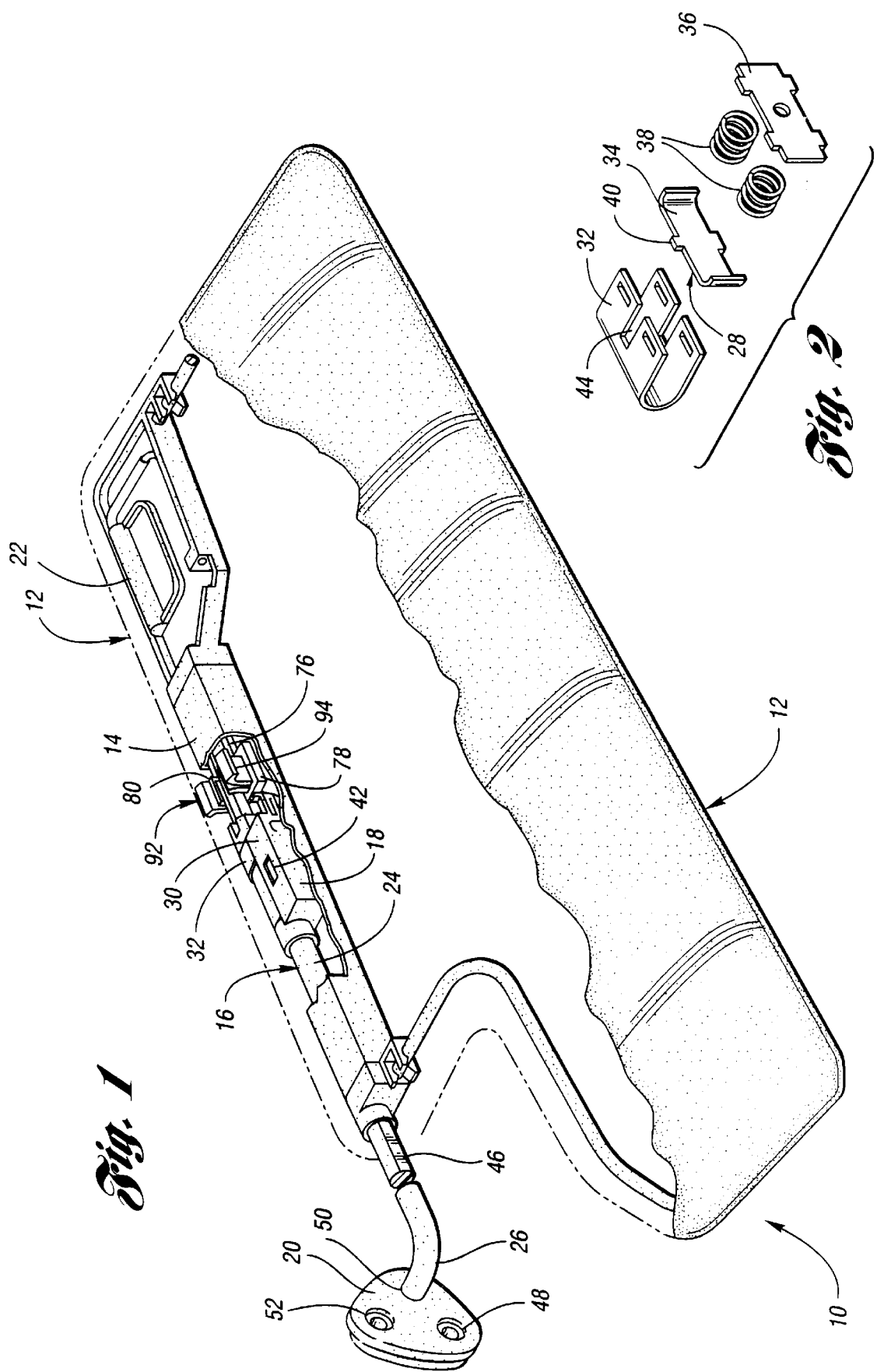

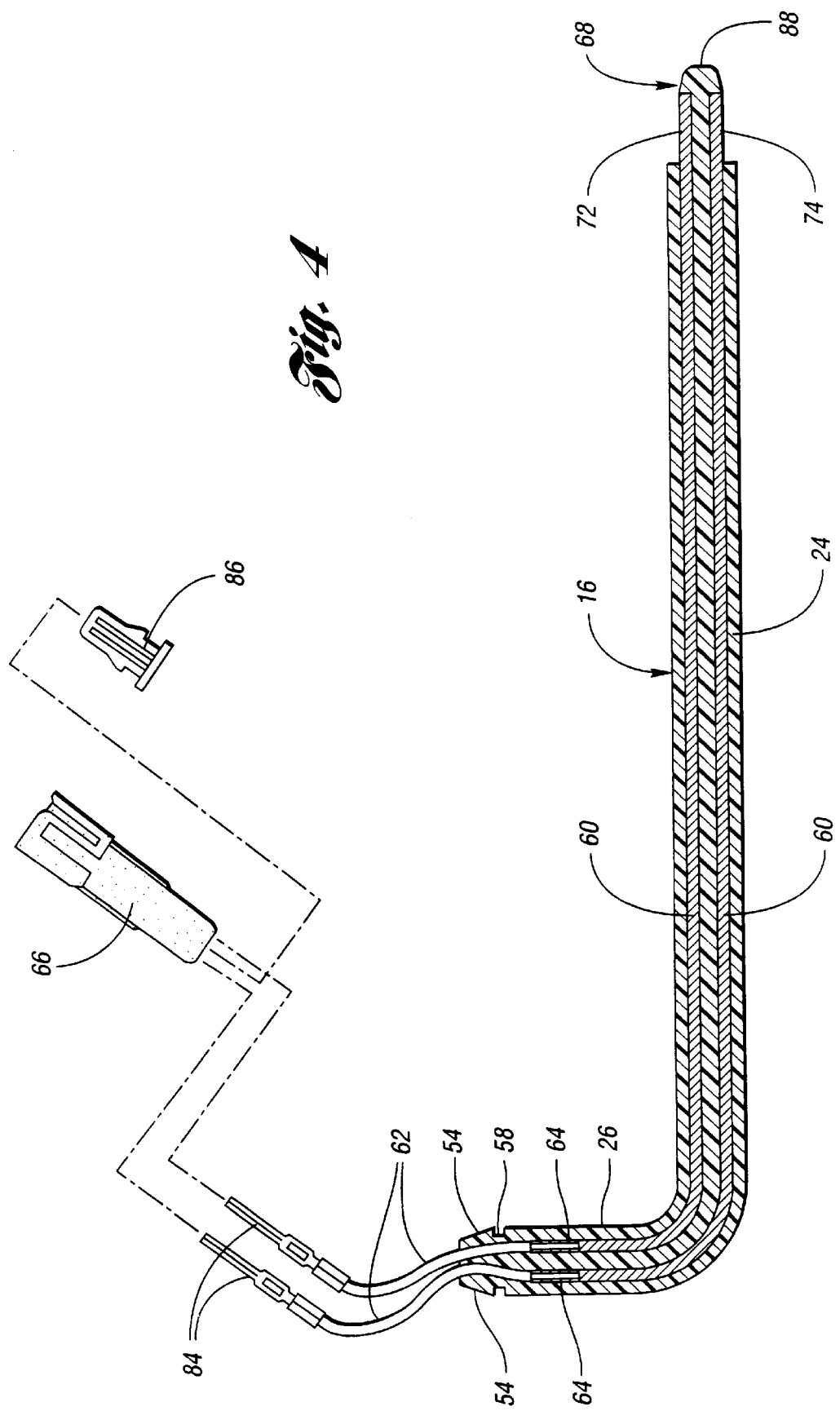

SLIDING CORE VISOR

CROSS-REFERENCE TO RELATED APPLICATION

This application claims the benefit of U.S. provisional application Ser. No. 60/082,883, filed Apr. 24, 1998.

TECHNICAL FIELD

The invention relates to a sliding core visor having an illuminated vanity mirror and, more particularly, to a sliding core visor that is selectively engageable with electrical power leads for illuminating a vanity mirror as it rotates about and longitudinally slides upon a support shaft, which is mounted to an automobile body by a swivel-bearing bracket having in-molded electrical wires and contacts.

BACKGROUND ART

It is known in the art to provide vehicle visors having illuminated vanity mirrors, wherein the visor is longitudinally slidable upon and rotatable about a support shaft that is connected to a vehicle headliner by a swivelable elbow in a bearing bracket. It is further known to include a sliding visor that has power supplied by a conduit passing through the support shaft and terminating in a connector having a detent coupled to a conductor in the visor and coupled to a light in a vanity. The power to the vanity is interruptible when the visor is slid longitudinally along the support shaft. Furthermore, the prior art includes continuous electrical contact for a vanity mirror in which the visor is longitudinally slidable along the support shaft by using a coiled electrical wire that is easily able to change length. Finally, the prior art includes incorporating insulated electrical wiring in an elbow bearing bracket formed of a pair of pre-formed half shells.

DISCLOSURE OF INVENTION

The disadvantages of the prior art can be addressed by providing a sliding core visor having an elbow bracket with in-molded electrical wires with a pair of exposed contact wire leads that are selectively operable with a pair of mating visor electrical contacts, which, in turn, are connected to a vanity lamp for supplying electrical power thereto when the visor is in a predetermined longitudinal and rotational position with respect to the swivelable elbow bearing bracket. Furthermore, there is a need for vanity mirror electrical contacts having concave main body portions with lead-in ramp electrical surfaces. Finally, there is a need for a visor that is longitudinally slidable on a swivelable support shaft having electrical contacts that connect with visor contacts only when the visor is in a predetermined longitudinal position on the elbow bracket and a predetermined rotational position about the longitudinal axis of the elbow bracket.

It is important in the vehicle visor art for the visors to provide many functions at the lowest possible cost. It is also important that the visors be pleasing in appearance and operation. The prior art visors do not have the desired combination of functionality, appearance and ease of operation. For example, the electrical conduits of several of the prior art visors must be installed after the molding of the visor and the longitudinal movement of some of the visors is hampered by the detent connection. These disadvantages are exacerbated by the current visor construction techniques in which much of the visor is molded in a single operation.

The sliding core visor according to the invention includes a visor supported by a shaft swivelable about a bearing bracket and having in-molded electrical wires and contacts with a pair of exposed contact wire leads that are selectively separable from a pair of mating visor electrical contacts that are connected to a vanity mirror assembly. According to another embodiment of the invention, the vanity mirror contacts include concave main body portions and lead-in ramp electrical contact surfaces. A further embodiment of the invention includes a sliding core visor having a visor body that is longitudinally slidable on a swivelable elbow bracket and having electrical contacts that are connected with visor contacts only when the visor is in a first longitudinally predetermined position and when the visor is in a predetermined rotational position about the longitudinal axis of the support shaft.

Accordingly, an object of the invention is to provide a vehicle sun visor shaft having in-molded electrical wires for carrying electrical power to a vanity mirror or the like.

Another object of the invention is to provide a vehicle sun visor assembly with a shaft having exposed contact surfaces engageable with first and second mating contacts when the sun visor body is in a predetermined pivotal and longitudinal position with respect to the sun visor shaft.

Other objects, features, and advantages of the invention will become apparent from the ensuing description in conjunction with the accompanying drawings.

BRIEF DESCRIPTION OF DRAWINGS

FIG. 1 is a partial perspective view of a sliding core visor assembly according to the invention;

FIG. 2 is an exploded view of a portion of a detent assembly for the sliding core visor assembly of FIG. 1;

FIG. 4 is a sectional view of in-molded electrical wires and contacts of the L-shaped support shaft of FIG. 1.

BEST MODE FOR CARRYING OUT THE INVENTION

Figure 3:
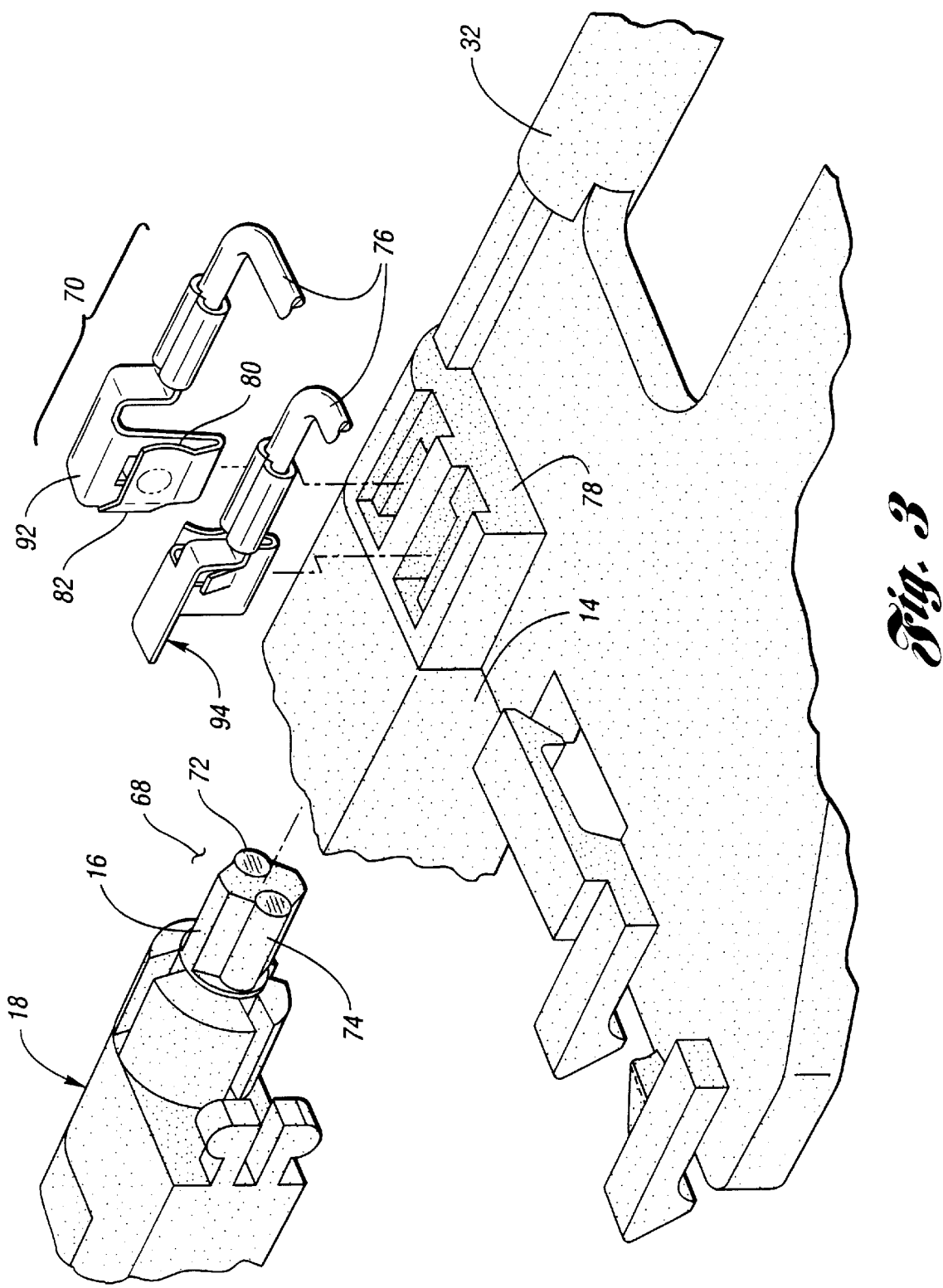
FIG. 3 is an exploded view of the junction between the exposed contact surface of the support shaft and the ramped electrical contacts of the visor assembly for the sliding core visor of FIG. 1.

Referring to the drawings and, in particular, to FIG. 1, the sliding core visor assembly for a vehicle (not shown) includes a visor body 10 which, in the region of an upper longitudinal edge 12, has a hollow body 14 inserted therein. The hollow body 14 slidably receives a detent assembly 18, which, in turn, rotatably mounts a support shaft 16. As best illustrated in FIG. 4, the support shaft 16 is approximately an L-shape, having a long arm 24 that is frictionally received by the detent assembly 18, which together slide within the hollow body 14, and a short arm 26 received in a swivel bearing bracket 20. The visor body 10 is customarily arranged on the long arm 24 of the support shaft 16 in the position shown in FIG. 1. So that the driver and front seat passenger of the vehicle can better shield themselves from incident sun rays or other action of light, the visor body 10 is longitudinally displaceable along the long arm 24 of the shaft 16. Furthermore, the visor body 10 is swivelable relative to the swivel bearing bracket 20 along with the support shaft 16 when the short arm 26 rotates about the swivel bearing bracket 20 so that the visor body 10 can be swung between a front side window and the windshield of the vehicle.

As is well known in the art, within the visor body 10, there is inserted a vanity mirror assembly that comprises a mirror and a source of illumination, such as a lamp. The electric current supply for the illuminating device, which can be fed from the general electric system of the vehicle, will be explained further below. U.S. provisional patent application Ser. No. 60/057,066 and U.S. Pat. No. 4,203,149, which describe in more detail a vanity mirror assembly having a source of illumination, are incorporated herein by reference.

Toward the opposite end of the visor body 10, also in the region of the upper longitudinal edge 12, there is a support pin 22 that is detachably engageable in a mounting recess of a mount (not shown), which is fastened to the body (not shown) of the vehicle, typically through a headliner (not shown), as is well known in the art. The support pin 22 is preferably arranged in line with the long arm of the support shaft 16 to form a common rotational axis for the visor body 10 between a storage position, adjacent the headliner and an operative position, adjacent a window.

As shown in FIG. 1, the detent assembly 18 includes a housing 30 and a U-shaped guide 32, which receives the long arm 24 of the support shaft 16 therethrough. As shown best in FIG. 2, the housing 30 includes a spring-biased follower 34 and a base 36, between which a pair of coil springs 38 are disposed. Tabs on the base 36 register with slots (not shown) on the housing 30 for securing the base within the housing. The springs 38 bias the follower 34 outwardly against the long arm 24 of the support shaft 16. The follower 34 also includes tabs 40, which register in slots 42 in the housing 30, as best shown in FIG. 1. Furthermore, the tabs 40 are received within slots 44 of the U-shaped guide 32. Specifically, the long arm 24 of the shaft 16 rides in the U-shaped guide 32 and is held therein by the spring-biased follower 34.

The long arm 24 of the shaft 16 includes a flat surface 46 along a longitudinal edge of the shaft 16 for registering with a flat face 28 of the follower 34 when the visor body 10 is rotated to its storage position. Because of the spring bias against the follower 34, the visor body 10 snaps into place against the headliner when the flat surface 46 registers with the flat face 28 of the follower 34. This design aids in retaining the visor body 10 in its upward position and out of view of the passenger and driver when in the storage position, and also prevents inadvertent movement of the visor body 10 to the operative position due to rocking or other vigorous vehicle motion.

The swivel bearing bracket 20 mounts the short arm 26 of the support shaft 16 for enabling the visor body 10 to swivel toward and away from the support pin 22 bearing mount mounted to the vehicle body, as described above. The swivel bearing bracket 20 also includes apertures 52 formed therein for receiving fasteners 48, such as screws, for securing the swivel bearing bracket 20 to the vehicle body. It further includes an aperture 50 for mounting the support shaft 16. More specifically, as shown in FIG. 4, the short arm 26 of the support shaft 16 includes a pair of spaced apart ramped tabs 54 for securing the support shaft 16 to the bracket 20, while allowing the shaft 16 to swivel. When inserted, the opposed tabs 54 flex toward one another in a space between them and the ramped outer surfaces 56 cam against a housing portion defining the aperture 50 until a widest portion of the tabs 54 extend beyond the housing defining the aperture 50, at which point the tabs 54 return to their normal outwardly biased position and the housing defining the aperture 50 rotates in a circumferential groove 58 adjacent the widest portion of the tabs 54, which locks the support shaft 16 in position for rotation relative the bracket 20.

As shown in FIG. 4, the support shaft 16 includes a pair of electrical inserts 60 for conducting electricity from electrical wires 62, which include terminals 64. Both the wires 62 and the inserts 60 are molded in the shaft 16, as are the terminals 64 effecting their connection in the short arm 26 of the shaft 16. The in-molded inserts 60 extend the length of the long arm 24 of the shaft 16 in approximately parallel paths. Within the swivel bracket 20 is a connector 66, which connects the vehicle's general electric system to the wires 62, insert 60, and thus, the vanity mirror assembly. A cap 86 locks terminal ends 84 of the wires 62 within the connector 66.

The support shaft 16 is preferably formed by over-molding the material comprising the support shaft 16 about the electrical inserts 60, terminals 64 and wires 62. The wires 62 extend outward from between the tabs 54 for connecting to the connector 66 in the bracket 20. Furthermore, the connection between the wire 62 and the electrical insert 60 and the short arm of a support shaft 16 are preferably soldered or sonic welded prior to over-molding. Preferably, the over-molding process includes the formation of a lead-in 68, which includes a ramped distal end 88 of the long arm 24 having a narrowed radius, whereby the electrical insert 60 are exposed to provide a pair of diametrically opposed shaft contacts 72,74. The ramped distal end 88 of the lead-in 68 aids in the interruptible engagement with a visor contact assembly 70, which is mounted at an end of the hollow body 14.

Referring now to FIG. 3, the connection between the shaft contacts 72,74 of the electrical insert 60 of the support shaft 16 and the visor contact assembly 70 is shown in exploded view. The visor contact assembly 70 includes wires 76 for providing electricity to a vanity mirror assembly as explained above. Furthermore, the visor contact assembly 70 includes a contact housing 78, which has an opening (not shown) adapted to receive the shaft lead-in 68 for engagement with visor contacts 92,94. Preferably, the visor contacts 92,94 are spaced apart within the housing 78 so as to provide a friction-fit receiving space for maintaining electrical contact between the shaft contacts 72,74 and the visor contacts 92,94. Further, each visor contact 92,94 includes a concave main body portion 80 and outwardly inclined ramped surface 82, which together help center and align the shaft contacts 72,74 when they are inserted into the contact housing 78.

In use, when the visor body 10 is in a stored position above the windshield, the shaft contacts 72,74 do not engage the visor contacts 92,94. Thus, no electricity is available from the general electrical system of the vehicle for illuminating a vanity mirror. As the visor body 10 rotates downward into an operating position to, for example, block the sun or use the mirror, the shaft contacts 72,74 come into engagement with the concave contact portions 80. This rotation is accomplished by rotating the long arm 24 of the shaft 16 within the guide 32 as aided by the spring-biased follower 34 Thus, in an operating position, electricity from the vehicle's general electrical system is available for illuminating the vanity mirror.

Next, if the visor body 10 is slid longitudinally along the support shaft 16, the shaft contacts 72,74 disengage from the visor contacts 92,94. To accomplish this displacement, the detect assembly 18 slides along, with the received long arm 24 of the shaft 16, within the hollow body 14 formed adjacent the longitudinal edge 12 of the visor body 10. Upon displacement, electricity is again not available for the vanity mirror assembly. As should be obvious, sliding the shaft 16 toward the contact housing 78 will force the engagement of the shaft contacts 72,74 and visor contacts 92,94, provided, of course, the visor body 10 is in the operative position. As mentioned above, the ramped distal end 88 of the lead-in 68 facilitates this engagement. If the visor body 10 is not in this operative position, the shaft contacts 72,74 remain out of alignment with the visor contacts 92,94 until the visor body 10 is rotated to the operative position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention as defined in the appended claims.

What is claimed is:

1. A vehicle sun visor assembly, comprising:
    a shaft configured for mounting in a vehicle, said shaft having first and second electrical wires carried therein and corresponding first and second exposed contact surfaces at distal ends of the first and second electrical wires; and
    a sun visor body pivotally attached to the shaft, said sun visor body including first and second mating contacts selectively engageable with said first and second exposed contact surfaces only when the sun visor body is in a predetermined pivotal position with respect to the shaft to provide electrical power to a vanity mirror; and
    wherein said first and second electrical wires are in-molded within the shaft.

2. The vehicle sun visor assembly of claim 1, wherein said sun visor body is slidably mounted to the shaft and said first and second exposed contact surfaces are engageable with said first and second mating contacts only when the sun visor body is in a predetermined longitudinal position with respect to the shaft.

3. The vehicle sun visor assembly of claim 1, wherein said shaft comprises a flat surface, and said sun visor body includes a flat follower face spring-loaded toward the flat surface to selectively retain the sun visor body in an upward position.

4. The vehicle sun visor assembly of claim 1, wherein said first and second mating contacts each include a concave main body portion and a lead-in ramp.

5. The vehicle sun visor assembly of claim 1, further comprising a bracket for securing the shaft in the vehicle, said shaft being swivelable with respect to the bracket.

6. A vehicle sun visor assembly, comprising:
    a shaft configured for mounting in a vehicle, said shaft including in-molded first and second electrical wires extending longitudinally along the shaft, said first and second electrical wires including corresponding first and second exposed contact surfaces spaced circumferentially about the shaft; and
    a sun visor body pivotally and slidably mounted to the shaft and including first and second mating contacts positioned for selective engagement with said first and second exposed contact surfaces only when the sun visor body is positioned at a predetermined pivotal and longitudinal position with respect to the shaft for providing electrical power to a vanity mirror.

7. The vehicle sun visor assembly of claim 6, wherein said shaft comprises a flat surface, and said sun visor body includes a flat follower face spring-loaded toward the flat surface to selectively retain the sun visor body in an upward position.

8. The vehicle sun visor assembly of claim 6, wherein said first and second mating contacts each include a concave main body portion and a lead-in ramp.

9. The vehicle sun visor assembly of claim 6, further comprising a bracket for securing the shaft in the vehicle, said shaft being swivelable with respect to the bracket.

10. A vehicle sun visor assembly, comprising:
    a bracket mountable in a vehicle;
    a shaft mounted to the bracket for swiveling movement with respect to the bracket, said shaft including in-molded first and second electrical wires extending longitudinally along the length of the shaft, said first and second electrical wires including corresponding first and second exposed contact surfaces spaced circumferentially about the shaft;
    a sun visor body pivotally and slidably mounted to the shaft and including first and second mating contacts positioned for selective engagement with said first and second exposed contact surfaces only when the sun visor body is positioned at a predetermined pivotal and longitudinal position with respect to the shaft for providing electrical power to a vanity mirror; and
    wherein said shaft comprises a flat surface, and said sun visor body includes a flat follower face spring-loaded toward the flat surface to selectively retain the sun visor body in an upward position.

11. The vehicle sun visor assembly of claim 10, wherein said first and second mating contacts each include a concave main body portion and a lead-in ramp.

\* \* \* \* \*

UNITED STATES PATENT AND TRADEMARK OFFICE
CERTIFICATE OF CORRECTION

PATENT NO.    : 6,139,083
DATED         : October 31, 2000
INVENTOR(S)   : Douglas A. Fischer et al.

It is certified that error appears in the above-identified patent and that said Letters Patent is hereby corrected as shown below:

Column 5,
Line 27, after "power to" insert -- a source of illumination for illuminating --.

Column 6,
Lines 12 and 41, after "power to" insert -- a source of illumination for illuminating --.

Signed and Sealed this

Twenty-third Day of December, 2003

JAMES E. ROGAN
*Director of the United States Patent and Trademark Office*